(12) United States Patent
Banerjee et al.

(10) Patent No.: US 11,499,856 B2
(45) Date of Patent: Nov. 15, 2022

(54) FREEZE PREDICTION, DETECTION, AND MITIGATION

(71) Applicant: Phyn LLC, Torrance, CA (US)

(72) Inventors: Salil P. Banerjee, Lynchburg, VA (US); Ryan Yong Kim, Rolling Hills Estates, CA (US)

(73) Assignee: Phyn LLC, Torrance, CA (US)

( * ) Notice: Subject to any disclaimer, the term of this patent is extended or adjusted under 35 U.S.C. 154(b) by 254 days.

(21) Appl. No.: 16/562,862

(22) Filed: Sep. 6, 2019

(65) Prior Publication Data

US 2020/0080878 A1  Mar. 12, 2020

Related U.S. Application Data

(60) Provisional application No. 62/729,265, filed on Sep. 10, 2018.

(51) Int. Cl.
*G01F 1/7084* (2022.01)
*G01M 3/28* (2006.01)
(Continued)

(52) U.S. Cl.
CPC ............ *G01F 1/7084* (2013.01); *E03B 7/071* (2013.01); *G01M 3/002* (2013.01); *G01M 3/007* (2013.01); *G01M 3/243* (2013.01); *G01M 3/2815* (2013.01)

(58) Field of Classification Search
CPC ..... E03B 7/071; G01M 3/2815; G01M 3/002; G01M 3/007; G01F 1/7084
See application file for complete search history.

(56) References Cited

U.S. PATENT DOCUMENTS

| 3,812,872 A | 5/1974 | Vodraska et al. |
| 4,635,668 A * | 1/1987 | Netter ..................... E03B 7/12 374/170 |

(Continued)

FOREIGN PATENT DOCUMENTS

| JP | 04371775 A | * 12/1992 |
| JP | H04371775 A | * 12/1992 |

OTHER PUBLICATIONS

International Application No. PCT/US2019/050209 received an International Search Report and Written Opinion dated May 20, 2020, 6 pages.

(Continued)

*Primary Examiner* — Peter J Macchiarolo
*Assistant Examiner* — Fatemeh Esfandiari Nia
(74) *Attorney, Agent, or Firm* — Kilpatrick Townsend & Stockton LLP

(57) ABSTRACT

Systems and methods for predicting, detecting, and/or mitigating a pipe freeze are provided. A system for analyzing water in a plumbing system includes a sensor that is configured to measure pressure within a pipe in the plumbing system as a function of time, and a processor that is configured to determine a state of water within the pipe by analyzing the pressure within the pipe as a function of time. The state of the water includes a prediction that the water within the pipe will freeze and/or a determination that the water within the pipe has frozen. The sensor is arranged at a first location within the plumbing system that is remote from a second location within the plumbing system that corresponds to the state of the water.

23 Claims, 15 Drawing Sheets

(51) Int. Cl.
  *E03B 7/07* (2006.01)
  *G01M 3/24* (2006.01)
  *G01M 3/00* (2006.01)

(56) References Cited

U.S. PATENT DOCUMENTS

| | | | |
|---|---|---|---|
| 4,730,637 | A | 3/1988 | Grove |
| 5,220,937 | A | 6/1993 | Roberts et al. |
| 5,287,876 | A * | 2/1994 | Takahashi ................. E03B 7/10 137/341 |
| 6,987,457 | B2 | 1/2006 | Shumei et al. |
| 9,528,524 | B2 | 12/2016 | Guzelgunler |
| 9,719,234 | B1 | 8/2017 | Christopher et al. |
| 9,759,632 | B2 * | 9/2017 | Trescott ................. G01F 1/6888 |
| 9,834,911 | B2 | 12/2017 | Everhart et al. |
| 10,094,095 | B2 | 10/2018 | Enev et al. |
| 10,352,814 | B2 | 7/2019 | Enev et al. |
| 2004/0045600 | A1 | 3/2004 | Hoggard |
| 2006/0174707 | A1 * | 8/2006 | Zhang ................. G01N 29/222 700/282 |
| 2006/0272830 | A1 | 12/2006 | Fima |
| 2007/0252013 | A1 | 11/2007 | Hengstebeck |
| 2009/0235992 | A1 | 9/2009 | Armstrong |
| 2012/0004778 | A1 | 1/2012 | Lai et al. |
| 2012/0211085 | A1 | 8/2012 | Abbing |
| 2016/0024759 | A1 | 1/2016 | Vinjamaram |
| 2017/0131174 | A1 * | 5/2017 | Enev ................... G01M 3/2815 |
| 2017/0138023 | A1 | 5/2017 | Dooley et al. |
| 2017/0362801 | A1 | 12/2017 | Van Goor |
| 2018/0010978 | A1 | 1/2018 | Bailey |
| 2019/0154539 | A1 | 5/2019 | Banerjee et al. |
| 2019/0224510 | A1 * | 7/2019 | Goyette ................. G01N 17/00 |
| 2021/0060370 | A1 * | 3/2021 | Goyette ............... G01N 17/043 |
| 2021/0125486 | A1 * | 4/2021 | Shabbir ................. G08B 21/20 |

OTHER PUBLICATIONS

International Search Report and Written Opinion in PCT/US2019/050209 dated Mar. 12, 2019, all pages.

* cited by examiner

FREEZE PREDICTION, DETECTION, AND MITIGATION

CROSS-REFERENCE TO RELATED APPLICATION

This application claims priority to U.S. Provisional Patent Application No. 62/729,265, filed on Sep. 10, 2018, entitled "FREEZE DETECTION/MITIGATION," the disclosure of which is hereby incorporated by reference in its entirety for all purposes.

BACKGROUND

This disclosure relates in general to systems and methods for predicting, detecting, and mitigating damage caused by frozen pipes in a plumbing system.

Homes and commercial buildings have water distributed by plumbing systems that include pipes having branches throughout the building. Some of the pipes may be arranged near an exterior wall of the building, such that the pipes are exposed to cold temperatures during the winter. Also, some of the pipes may have weak segments that are more susceptible to freezing. If a pipe freezes and subsequently bursts, a significant amount of water may flow into the building, causing damage to the property.

SUMMARY

Exemplary embodiments of the invention provide systems and methods for predicting, detecting, and/or mitigating damage caused by frozen pipes in a plumbing system that includes a branched system of pipes within a building. According to an aspect of the invention, a system for analyzing water in a plumbing system includes a first sensor that is configured to measure pressure within a pipe in the plumbing system as a function of time, and a processor that is configured to determine a state of water within the pipe by analyzing the pressure within the pipe as a function of time. The state of the water includes a prediction that the water within the pipe will freeze and/or a determination that the water within the pipe has frozen. The first sensor is arranged at a first location within the plumbing system that is remote from a second location within the plumbing system that corresponds to the state of the water.

The state of the water may be determined by analyzing a slope of the pressure within the pipe as a function of time. Alternatively or in addition, the state of the water may be determined by performing a spectral analysis of the pressure within the pipe as a function of time.

The state of the water may be confirmed by analyzing temperature measurements from at least one of within a building that houses the pipe or outside of the building that houses the pipe. Alternatively or in addition, the system may also include a transmitter that is configured to transmit a sonar tone toward the second location that corresponds to the state of the water and a first receiver that is configured to receive the sonar tone after the sonar tone has been transmitted through the second location, and/or a second receiver that is configured to receive the sonar tone after the sonar tone has been reflected at the second location. The processor may be further configured to confirm the state of the water by analyzing a signal corresponding to the sonar tone from the first receiver and/or the second receiver.

The processor may be further configured to determine the second location that corresponds to the state of the water by analyzing the pressure within the pipe as a function of time.

Alternatively or in addition, the system may also include a valve that is connected to the pipe and a transceiver that is configured to send a signal to open the valve as a function of the state of the water. Alternatively or in addition, the system may also include a heater that is configured to apply heat to the second location as a function of the state of the water.

The system may also include a flow sensor that is configured to measure a flow of the water within the pipe. The processor may be further configured to determine whether the pipe has burst by analyzing the flow of the water within the pipe. Alternatively or in addition, the processor may be further configured to determine whether the pipe has burst by analyzing the pressure within the pipe as a function of time.

The system may also include a second sensor that is configured to measure pressure within the pipe in the plumbing system as a function of time. The second sensor may be arranged at a third location within the plumbing system that is remote from the second location within the plumbing system that corresponds to the state of the water. The processor may be further configured to determine the second location that corresponds to the state of the water by triangulating measurements from the first sensor and the second sensor.

According to another aspect of the invention, a method for analyzing water in a plumbing system is provided. The method may include measuring, by a first sensor, pressure within a pipe in the plumbing system as a function of time, and determining, by a processor, a state of water within the pipe by analyzing the pressure within the pipe as a function of time. The state of the water includes at least one of a prediction that the water within the pipe will freeze or a determination that the water within the pipe has frozen. The first sensor is arranged at a first location within the plumbing system that is remote from a second location within the plumbing system that corresponds to the state of the water.

The state of the water may be determined by analyzing a slope of the pressure within the pipe as a function of time. Alternatively or in addition, the state of the water may be determined by performing a spectral analysis of the pressure within the pipe as a function of time.

The state of the water may be confirmed by analyzing temperature measurements from at least one of within a building that houses the pipe or outside of the building that houses the pipe. Alternatively or in addition, the method may also include transmitting, by a transmitter, a sonar tone toward the second location that corresponds to the state of the water and confirming, by the processor, the state of the water by analyzing a signal corresponding to the sonar tone after the sonar tone has been transmitted through the second location and/or the sonar tone has been reflected at the second location. Alternatively or in addition, the method may also include determining, by the processor, the second location that corresponds to the state of the water by analyzing the pressure within the pipe as a function of time.

The method may also include sending, by a transceiver, a signal to open a valve that is connected to the pipe as a function of the state of the water. Alternatively or in addition, the method may include applying, by a heater, heat to the second location as a function of the state of the water.

The method may also include measuring, by a flow sensor, a flow of the water within the pipe, and determining, by the processor, whether the pipe has burst by analyzing the flow of the water within the pipe. Alternatively or in addition, the method may also include determining, by the processor, whether the pipe has burst by analyzing the pressure within the pipe as a function of time.

The method may also include measuring, by a second sensor, pressure within the pipe in the plumbing system as a function of time, and determining, by the processor, the second location that corresponds to the state of the water by triangulating measurements from the first sensor and the second sensor. The second sensor may be arranged at a third location within the plumbing system that is remote from the second location within the plumbing system that corresponds to the state of the water.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

In one embodiment, a method for detecting that a pipe is frozen or about to freeze in the plumbing system is disclosed. Sensors coupled with the water in the plumbing system may be used to predict and/or detect the pipe freeze, and determine where the pipe freeze might have occurred. Further, pressure increases, changes in pressure or sound spectra, cold weather, temperature changes, leak egress, and/or other measurements may be used to determine that a leak condition exists. Mitigation or remediation can be performed, such as activating fixtures, shutting off the water main, heating the building, etc.

Figure 1:
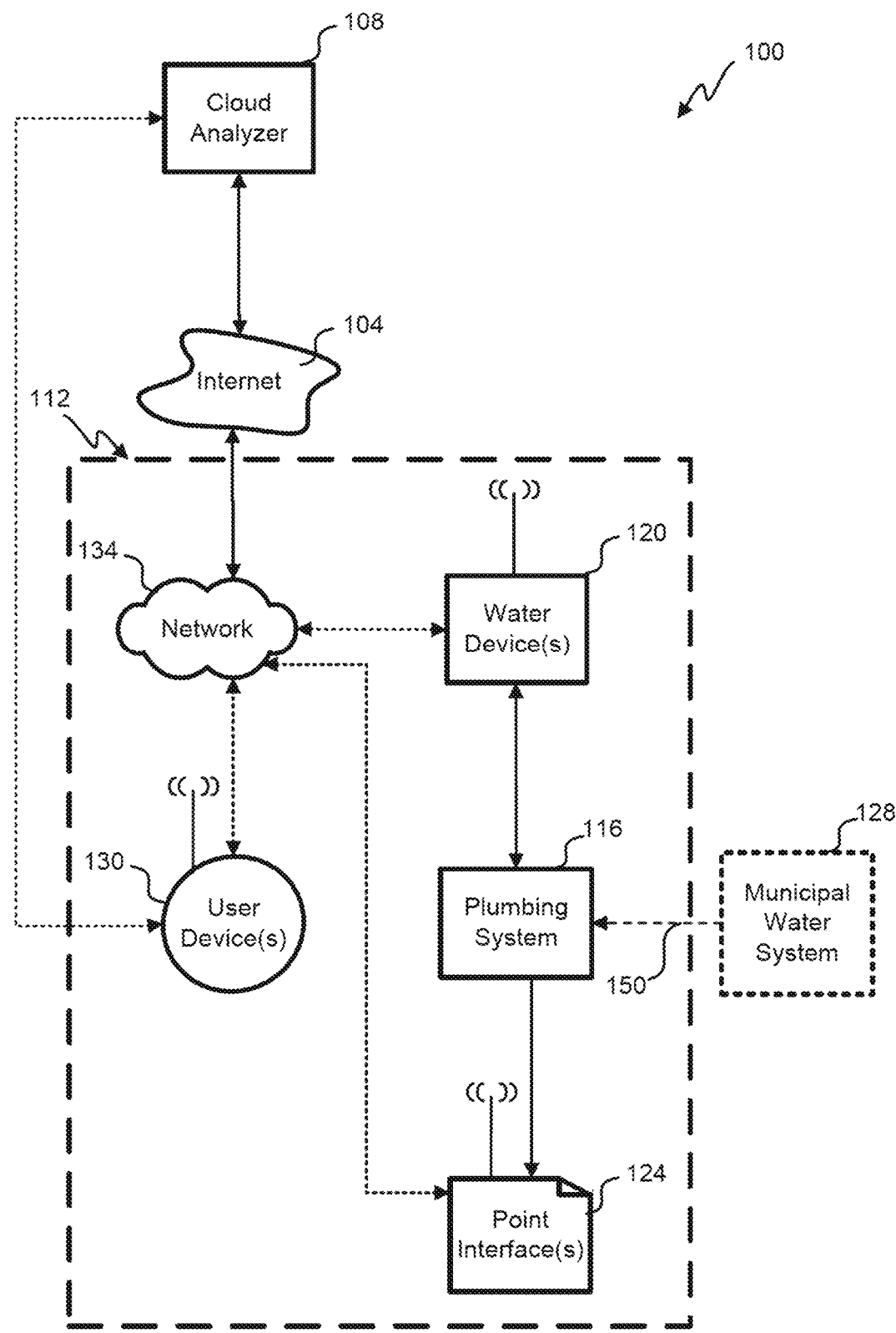
FIG. 1 depicts a block diagram of an embodiment of a water analysis system.

Referring first to FIG. 1, a block diagram of an embodiment of a water analysis system 100 is shown. The municipal water system 128 is connected to the building 112 with a water main 150, but other embodiments could source their water from a well, a cistern, a tank, or any other source. Different water sources may use different flow and leak detection algorithms.

The water from the municipal water system 128 has a temperature that varies relatively slowly since they are typically delivered via pipes which are buried underground. With the ground acting as a heat sink there is less variation in temperature as compared to the atmospheric temperature. The temperatures of municipal water systems 128 vary slightly from around 40 to 55° F. (4 to 13° C.). Such temperature changes are dependent upon well depth and aboveground storage facilities. Surface water temperatures vary with seasonal change from around 40 to 80° F. (4 to 27° C.) with even higher temperatures in the deep South and Southwest of the United States for example. It can be said that the municipal water system 128 temperature remains relatively stable during a given season for a given location (temperature varies from 38° F. in Anchorage, Ala. to 82° F. in Phoenix, Ariz.). The temperature changes seen in the plumbing system 116 are due to water flowing through the pipes and can help detect small unintended water usages or leaks continuously without engaging the shut-off-valve or other techniques that actively engage the plumbing system as described in application Ser. No. 15/344,458, entitled "SYSTEM AND METHOD FOR LEAK CHARACTERIZATION AFTER SHUTOFF OF PRESSURIZATION SOURCE," filed on Nov. 4, 2016, which is incorporated by reference for all purposes.

When water is stagnant or unmoving in the pipes (i.e., there is no intentional water egress or leaks) the temperature of water varies based on the temperature of where the water device 120 is installed and the temperature of the municipal water system 128 entering the building. Where the water device 120 is installed inside a building, for example, the temperature will stabilize at the ambient temperature typically regulated by a HVAC thermostat. On the other hand, if the water device 120 is placed outdoors it will vary as the weather changes over the course of the day. For small flows that are not detected by conventional flow sensors, there is a change in the temperature noted by the water device 120. Depending on the rate of water flow, the temperature measured by the water device 120 stabilizes at a certain temperature that is between the temperature of the municipal water system 128 and the temperature the plumbing system is exposed to in the building 112.

Remote from the building 112 over the Internet 104 is a cloud analyzer 108 that is in communication with various buildings and user devices 130. User account information, sensor data, local analysis, municipal water usage information for the building 112 is passed to the cloud analyzer 108. User devices 130 may connect with the water device 120 and the cloud analyzer through a local network 134 and/or a cellular network. The water device 120 can have an Ethernet, a broadband over power line, a WiFi, Bluetooth, and/or a cellular connection coupled to the cloud analyzer 108.

Some embodiments include a gateway or peer node that the water device can connect to that is coupled to the network 134 and/or Internet 104 using WiFi, Bluetooth, Zigbee, or other short range wireless signals. Generally, there is a gateway or firewall between the network 134 and the Internet 104. Where there are multiple water devices 120 they can communicate directly with each other or through the network 134 or other LAN/WAN.

Within the building 112, the plumbing system 116 is a collection of pipes connected to appliances and fixtures all coupled to the water main 150. A building 112 may have one or more water device(s) 120 in fluid communication with the plumbing system 116. A water device 120 may be coupled to the cold and/or hot water pipe at a particular location, or coupled to any accessible faucet or other source of water, and wirelessly or wire communicates with the network 134. Different water devices 120 may have different configurations with more or less sensors and processing capabilities. Some water devices 120 have only peer communication with other water devices 120 while others have LAN and/or WAN capabilities.

Pressure in the plumbing system can be analyzed with the water device 120 along with temperature, flow, sound, etc. The municipal water system 128 is pressurized so that the plumbing fixtures dispense water when opened. The water main 150 into the building is typically at 80-120 psi. Most buildings buffer the water main pressure with a pressure reducing valve (PRV) to lower the pressure to 40-70 psi, which also isolates noise seen with sensors when connected directly to the water main 150. Within the building 112, temperature and pressure are stabilize at a given rate of flow caused by leak or intentional egress from the plumbing system 116. Measuring with various sensors at the water device 120 allows detecting egress even for situations with a conventional flow sensor cannot perceive any usage.

The water device(s) 120 uses different techniques to find very small leaks in the plumbing system 116 that are not detected by a conventional flow sensor. For example, turbine flow meters do not sense below 0.7 gpm and ultrasonic flow sensors have resolution down to 0.1-0.2 gpm. Statistical approaches and signal processing techniques process temperature, pressure and/or other sensor readings for the leak detection by relying on variations of the temperature signal to provide first insights into the possibility of a leak with pressure and/or flow sensing optionally assisting in validating the likelihood of a leak in the plumbing system 116. Embodiments allow detection of leaks below 0.7 gpm and as low as 0.06 gpm in various embodiments.

One or more point interface(s) 124 may or may not be in fluid communication with the plumbing system, but can gather data in some embodiments such as ambient temperature, temperature outside the pipe, water pressure inside the pipe, and/or acoustic waves inside or outside the pipe. The point interfaces 124 are coupled to the network 134 to allow input and output to the user with an interface, and/or could use peer connection with other point interfaces 124 and/or water devices 120. The point interface 124 may be separate from the plumbing system 116 altogether while providing status on the water analysis system 100 such as instantaneous water usage, water usage over a time period, water temperature, water pressure, error conditions, etc. relayed from a water device 120. Error conditions such as leaks, frozen pipes, running toilets or faucets, missing or defective PRV, water bill estimates, low pressure, water heater malfunction, well pump issues, and/or other issues with the plumbing system 116 can be displayed at the point interfaces 124.

The user device 130 can be any tablet, cellular telephone, web browser, or other interface to the water analysis system 100. The water device(s) 120 is enrolled into a user account with the user device 130. Some or all of the information available at a point interface 124 can be made available to the user device using an application, app and/or browser interface. The user device 130 can wired or wirelessly connect with the water device(s) 120, cloud analyzer 108, and/or point interface(s) 124 using the LAN network 134 or a WAN network.

Figure 2:
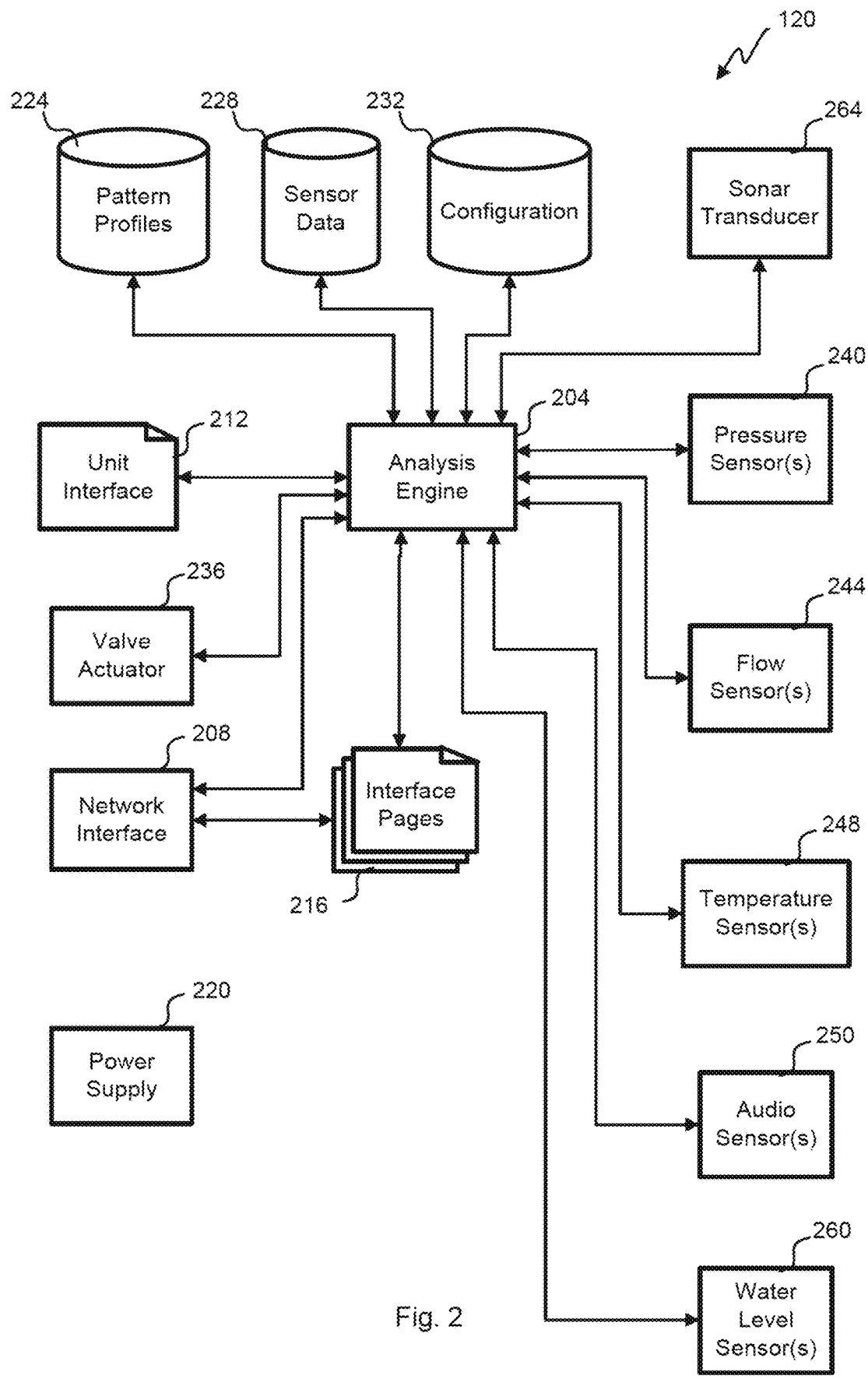
FIG. 2 depicts a block diagram of an embodiment of a water device.

With reference to FIG. 2, a block diagram of an embodiment of a water device 120 is shown. Different versions of water device 120 may have fewer components, for example, a water device 120 at an egress point or fixture may only have pressure and temperature sensors 240, 248 with a network interface 208 to relay that information to another water device 120 for processing. A power supply 220 could be internal or external to the water device 120 to provide DC or AC power to the various circuits. In some embodiments, a replaceable battery provides power while other embodiments use the water pressure to drive a turbine that recharges a battery to provide power without using grid power.

Some water devices 120 include a valve actuator 236 that operates a valve suspending flow from the water main 150. If there is a leak detected or testing is performed, the valve actuator 236 may be activated to prevent further consumption of water from the municipal water system 128. In some embodiments, the valve actuator 236 can partially constrict the water flow to change the water pressure in the building 112. Modulating the water pressure with the valve actuator 236 allows introduction of pressure waves into the plumbing system 116.

An analysis engine 204 gathers various data from the pressure sensor(s) 240, flow sensor(s) 244, temperature sensor(s) 248, and audio sensor(s) 250, sonar transducer 264, and/or water level sensor(s) 260. Interface pages 216 allow interaction with the water device 120 through a network interface 208 in a wired or wireless fashion with the user device(s) 130. The analysis engine 204 also supports a unit interface 212 that is physically part of the water device 120 to display various status, information and graphics using an OLED, LED, LCD display and/or status lights or LEDs.

Various information is stored by the water device 120, which may be reconciled with the cloud analyzer 108 in-whole or in-part using the network interface 208 coupled with the LAN network 134 or the Internet 104 using a cellular modem. Sensor data for the various sensors 240, 244, 248, 250, 260, 264 are stored in the sensor data store 228 over time to allow for longitudinal analysis. For example, several hours through several days of sensor data can be stored. The granularity of readings and length of time stored may be predefined, limited by available storage or change based upon conditions of the plumbing system 116. For example, data samples every second over a two day period could be stored, but when a leak is suspected the sample rate could increase to sixty times a second for four hours of time.

When fixtures or appliances interact with the water in the plumbing system 116, recognizable patterns occur at the water device 120. Pattern profiles 224 are stored to quickly match current sensor readings to known events. For example, a particular faucet when used may cause the flow, pressure and/or temperature sensor 244, 240, 248 readings to fluctuate in a predictable manner such that the pattern profile can be matched to current readings to conclude usage is occurring at a particular egress point. application Ser. No. 14/937,831, entitled "WATER LEAK DETECTION USING PRESSURE SENSING," filed on Nov. 10, 2015, describes this analysis and is incorporated by reference for all purposes. The pattern profiles 224 can be in the time domain and/or frequency domain to support various condition matching by the analysis engine 204. Both intentional egress and leaks have pattern profiles 224 that are stored.

Audio patterns and sonar patterns captured respectively from the audio sensor 250 and sonar transducer 264 are also stored as pattern profiles 224. The sonar transducer 264 may also emit bursts or pulses into the water at different frequencies, amplitudes and durations stored with the other pattern profiles 224. The sonar transducer 264 can also operate as a microphone to listen to reflections of the signals sent or from other water devices 120 in lieu of the audio sensor 250 or in addition to the audio sensor 250. Some pressure sensors are sensitive to the 120 Hz or lower spectrum to also act as a sonar microphone. The audio sensor(s) 250 could be coupled to the water, pipes, appliances, fixtures, and/or ambient air in the building 112 in various embodiments.

A configuration database 232 stores information gathered for the water device 120. The Table depicts water supply parameters stored in the configuration database 232. Type of plumbing system 116 includes those without a PRV, using well water, with a working PRV, and with a non-functional PRV. The water supply to the water main 150 can be from the municipal water system 128, a well, a water tank, and/or other source. The configuration database 232 can be automatically populated using algorithms of the analysis engine 204 or manually entered by the user device 130. Different fixtures and appliances connected to the plumbing system 116 are noted in the configuration database 232 as automatically determined or entered manually.

TABLE

| Water Supply | |
|---|---|
| Field | Options |
| Type | No PRV |
|  | Well water |
|  | Working PRV |
|  | Non-Functional PRV |
| Supply | Municipal water |
|  | Well |
|  | Tank |

Figure 3:
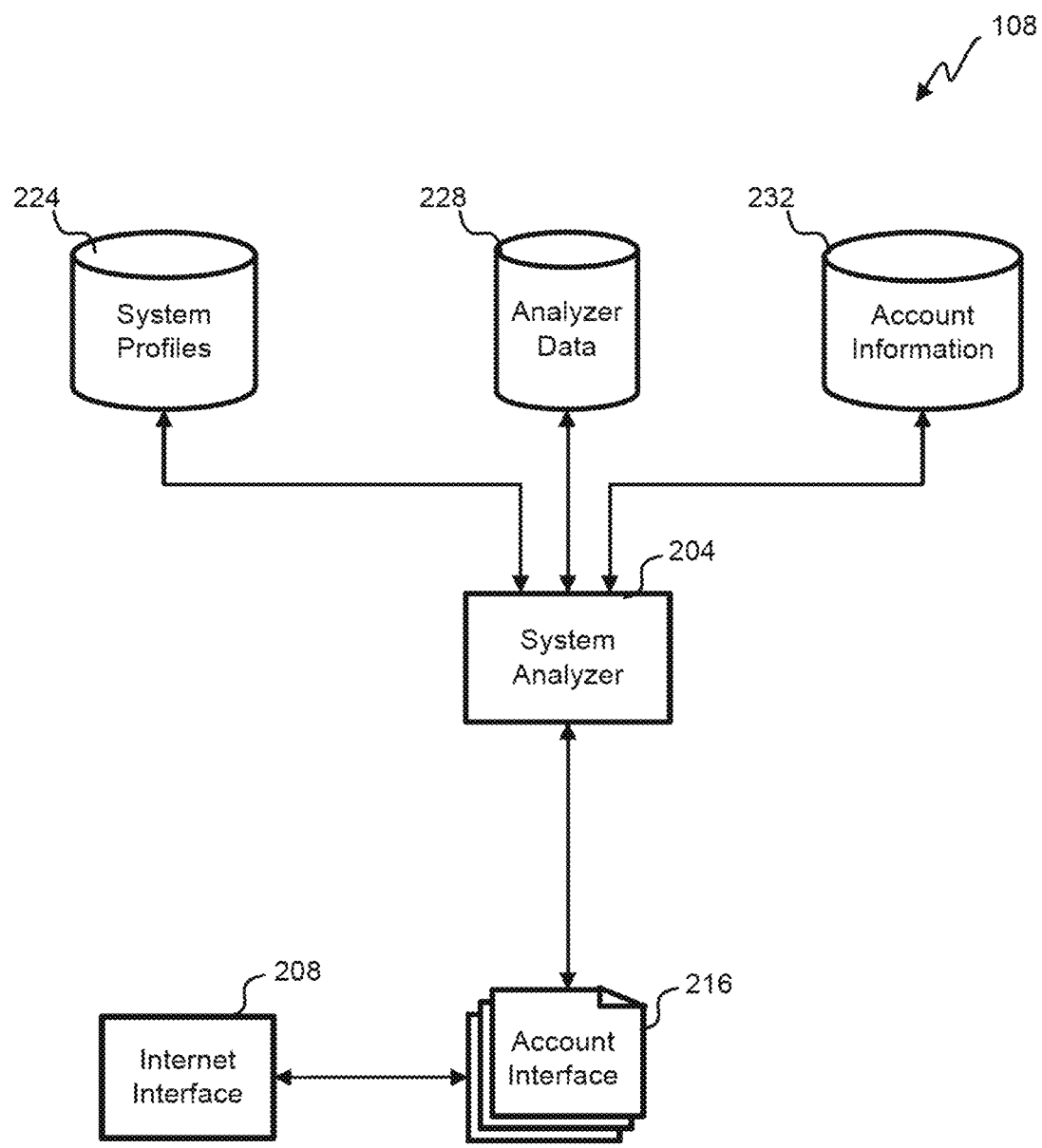
FIG. 3 depicts a block diagram of an embodiment of a cloud analyzer.

Referring next to FIG. 3, a block diagram of an embodiment of a cloud analyzer 108 is shown. The cloud analyzer 108 receives data and configuration information from many buildings 112 throughout the water analysis system 100. Each building 112 has a system profile 224 that is stored including the fixtures, appliances, water device(s) 120, point interface(s) 124, type of water supply, water source type, etc. are stored. Account information 232 including login credentials, building location, and/or user demographic information is also stored. Gathered sensor data in raw and processed form is stored as analyzer data 228 and could include usage history, specific egress events, leaks detected, fixture profiles, appliance profiles, etc.

The system analyzer 204 can process the data from each building 112 to find patterns corresponding to leaks, malfunctions, and other events that are not recognized by the water device 120 locally. By gathering sensor information from many buildings 112, the system analyzer 204 can use machine learning and big data to find very weak signals in the gathered sensor information. The system analyzer 204 can access any water device 120 or point interface 124 to test functionality, update software, and/or gather data. Where a user device 130 is coupled to the cloud analyzer 108, the system analyzer 204 receives commands to perform requested tasks from users. For example, the user device 130 can query for usage on a per fixture or appliance basis. Overall usage by the plumbing system 116 in the associated building 112 can also be determined. The system analyzer 204 can access the water utility usage and billing to provide insights into costs and overall consumption. For those utilities that provide usage information in real time, the usage and cost can be determined for each use of the plumbing system 116.

An account interface 216 allows various water devices 120 and user devices 130 to interact with the cloud analyzer 108 through an internet interface 208. The cloud analyzer 108 provides historical and real time analysis of buildings 118 a user is authorized to access. Various interaction pages of the account interface 216 allows entry of plumbing system information, configuration parameters, building location, and/or user demographic information. Various reports and status parameters are presented to the user device 130 through the account interface 216.

Figure 4:
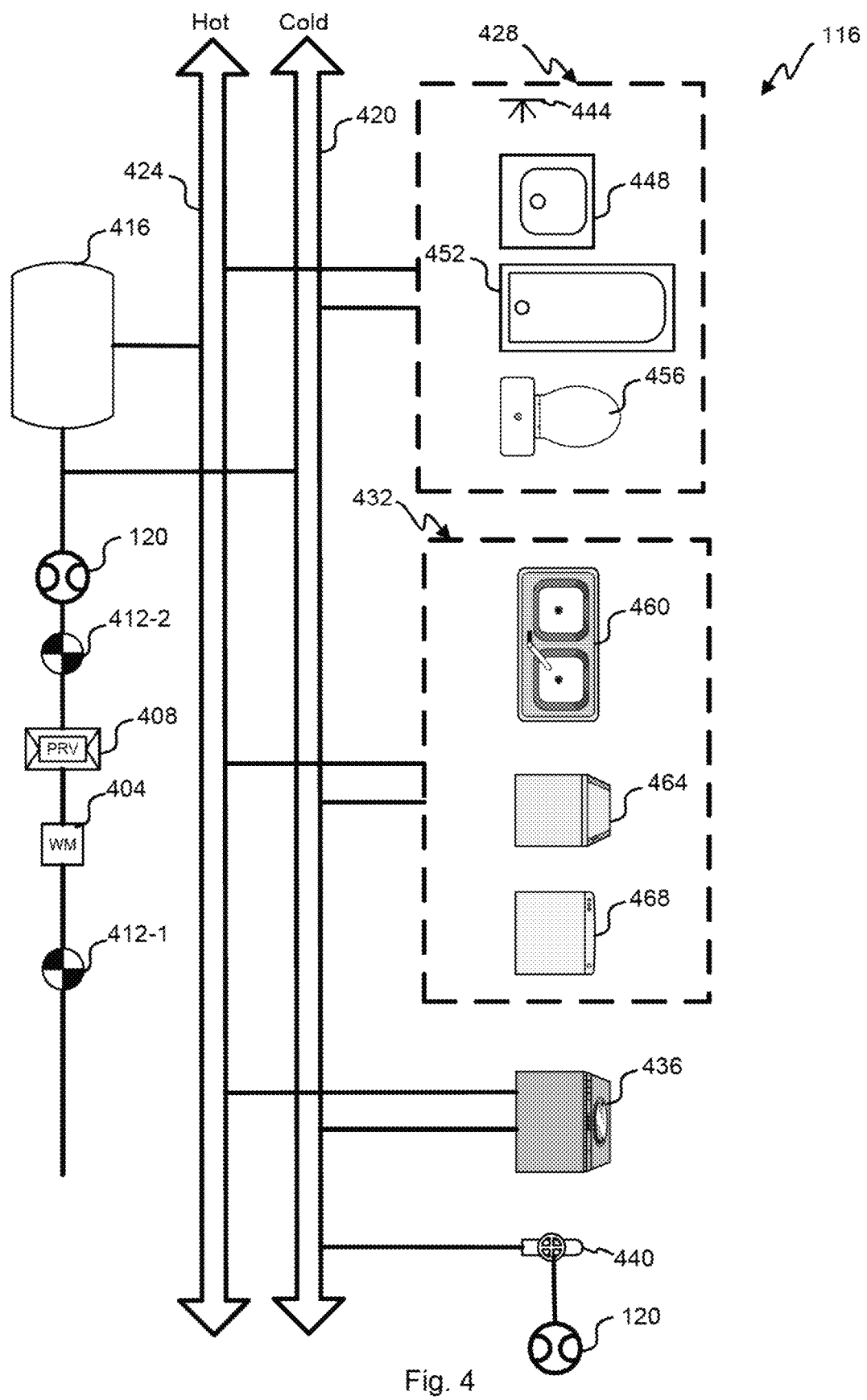
FIG. 4 depicts a block diagram of an embodiment of a plumbing system.

With reference to FIG. 4, a block diagram of an embodiment of a plumbing system 116 is shown. The municipal water system 128 is connected to a main shutoff valve 412-1 before the water main 150 passes through a water meter 404 provided by the municipality for billing purposes. The water meter 404 may be electronically or manually read to determine the bill, but some embodiments allow real time reading of the water meter 404 electronically over a WAN or LAN.

Building codes often require use of a PRV 408, but not universally. Older homes may also be missing a PRV, have one that no longer functions properly or have less than 80 psi supplied by the municipal water system 128. A building shutoff valve 412-2 is often located interior to the building 112 and provides another place to close off the water main. A water device 120 is located after the building shutoff valve 412-2, but before a water heater 416 in this embodiment. The water device 120 can be placed under the sink, near an appliance or any other location where fluid coupling is convenient with a source of power nearby.

In this example, a portion of a water line may be removed, such that the water device 120 may be installed inline with the water line. Alternatively, as discussed in further detail below, the water device 120 can be coupled to a fixture 440 through which water can flow, such as a water spigot or faucet. The hot water pipes 424 provide heated water to the building 118 and the cold water pipes 420 provide unheated water varying between the ambient temperature in the building 112 and the temperature of the municipal water system 128. The hot water pipes 424 may include a circulation pump. The hot and cold water pipes 424, 420 could branch and split in any configuration as they are fed through the walls and floors of the building 112.

This embodiment has a single bathroom 428, a kitchen 432, a washing machine 436, and a water spigot 440, but other embodiments could have more or less fixtures and appliances. The bathroom 428 has a shower 444, sink 448, bathtub 452, and toilet 456 that use water. The sink 448, bathtub 452, and shower 444 are all hooked to both the hot and cold water pipes 424, 420. The toilet 456 only requires cold water so is not hooked to the hot water pipes 424. Other buildings 112 could have any number of egress points from the plumbing system 116.

The kitchen 432 includes a two-basin sink 460, a refrigerator 464 with a liquid/ice dispenser, and a dishwasher 468. The refrigerator 464 only receives cold water 420, but the two-basin sink 460 and dishwasher 468 receive both cold and hot water pipes 420, 424. Kitchens 432 commonly include single-basin sinks and other appliances that might be coupled to the water. A typical building 112 has hundreds or thousands of pipes branching in every direction.

Figure 5:
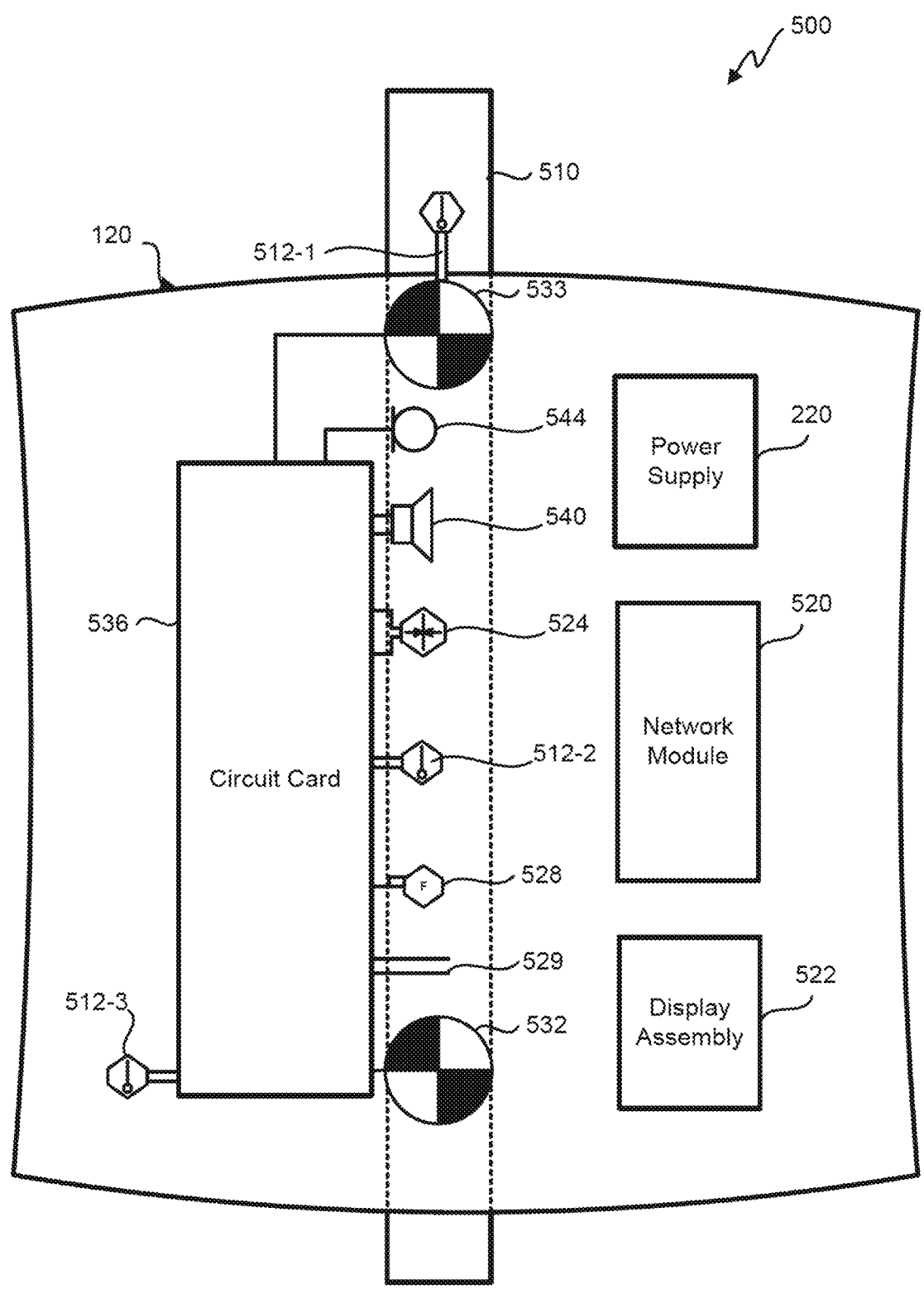
FIG. 5 depicts a block diagram of an embodiment of an installed water device.

Referring next to FIG. 5, a diagram of an embodiment of a water device 500 is shown. The water device 120 may pass water through a pipe 510 that is integral to the water device 120. The pipe 510 may be attached on both ends to either a hot or a cold water line 424, 420. Alternatively, the top of the pipe 510 may be connected to an adapter for a faucet. The integral portion of the pipe 510 could be made of copper, PVC, plastic, or other building pipe material and could be mated to the plumbing system 116 with soldered joints, glued joints, and/or detachable and flexible hoses in various embodiments.

There are several modules that make up the water device 120. A power supply 220 powers the water device 120 and could be internal or external to the enclosure. A network module 520 includes the network interface 208 to allow wired or wireless communication with the network 134 and Internet 104 to other components of the water analysis system 100. A display assembly 522 includes the unit interface 212.

Another module is the circuit card 536 which performs the processing for various sensors. Sensor information can be processed on the circuit card 536 using the analysis engine 204 and/or processed in the cloud using the system analyzer 204. Sensor information is gathered and analyzed over hours and days to find weak signals in the data indicating usage, leaks and other issues. The circuit card 536 might recognize sensor samples of interest and upload those to the cloud analyzer 108 for deep learning of the sensor data. The circuit card 536 and cloud analyzer 108 can use artificial intelligence, genetic algorithms, fuzzy logic, and/or machine learning to recognize the condition and state of the plumbing system 116.

This embodiment includes three temperature sensors 512 to measure the ambient temperature with a temperature sensor 512-3 near the outside of the enclosure and away from the internal electronics and water temperature of the water in the pipe 510 in two locations. A first temperature sensor 512-1 measures water temperature in contact with the water as it enters the pipe 510 of the water device 120 away from any heat that the various circuits might generate. A second temperature sensor 512-2 measures water temperature at a second location within the pipe 510 and away from the first temperature sensor 512-1. Based upon readings of the two water temperature sensors 512-1, 512-2, the heat generated by the water device 120 is algorithmically corrected for. A third temperature sensor 512-3 measures the ambient temperature outside of the pipe 510. Other embodiments may only use a single water temperature sensor and/or forgo the ambient temperature sensing. Ambient temperature may be measured by other equipment in the building and made available over the network 134, for example, the thermostat, smoke detectors, other water devices 120, and/or point interface(s) 124 can measure ambient temperature and provide it to other equipment in the building 112. Some embodiments could have a temperature sensor outside the building 112 or gather that information from local weather stations over the Internet 104.

This embodiment includes an electronically actuated shutoff valve 532. The shutoff valve 532 can be used to prevent flooding for leaks downstream of the water device 120. Additionally, the shutoff valve 532 can aid in detecting leaks. For example, the shutoff valve 532 and detecting a falling pressure is indicative of a leak downstream. Some embodiments can partially close the shutoff valve 532 to regulate pressure downstream. A one-way valve 533 may also be provided to regulate water flow into the pipe 510 and force it to flow in one direction.

A flow sensor 528 is used to measure the motion of water in the in the pipe 510. In this embodiment, an ultrasonic flow sensor is used, but other embodiments could use a rotameter, variable area flow meter, spring and piston flow meter, mass gas flow meters, turbine flow meters, paddlewheel sensors, positive displacement flow meter, and vortex meter. Generally, these meters and sensors cannot measure very small flows in a pipe in a practical way for building deployments. A plurality of electrodes 529 including a reference electrode and a measurement electrode may be provided within the pipe 510 to indicate a water level within the pipe 510.

This embodiment includes a sonar emitter 540 that produces sound tones, pules and/or bursts at different frequencies. A sonar microphone 544 receives sonar signals from the water in the pipe 510. Reflections from the various branches of the plumbing system 116 will produce reflections of different amplitude and delay according to the length of travel and other factors. When there are blockages in the plumbing system 116 from valves, clogs and/or frozen pipes, the echoes from the sonar emissions are received by the sonar microphone 544. Changes in the time delay between transmission and receiving of sonar signals indicate blockage or other changes in the plumping system 116. Other embodiments may combine the sonar emitter and microphone with a single sonar transducer.

The circuit card 536 is connected with a pressure sensor 524, which is coupled to the water in the pipe 510. Readings from the pressure sensor 524 are used to test the PRV 408, well pump, water supply, freeze conditions, and pipe for leaks as well as identify normal egress from the water fixtures and appliances. Pressure and temperature vary with flow such that the pressure sensor 524 and temperature sensor 512-1, 512-2 can be used to detect flow as small as tiny leaks under certain circumstances. The circuit card 536 observes trends in the sensor data, performs spectral analysis, pattern matching and other signal processing on the sensor data. application Ser. No. 15/818,562, entitled "PASSIVE LEAK DETECTION FOR BUILDING WATER SUPPLY," filed on Nov. 20, 2017, describes how to use the water device 500 to detect and characterize small leaks, and is incorporated by reference for all purposes.

Figure 6:
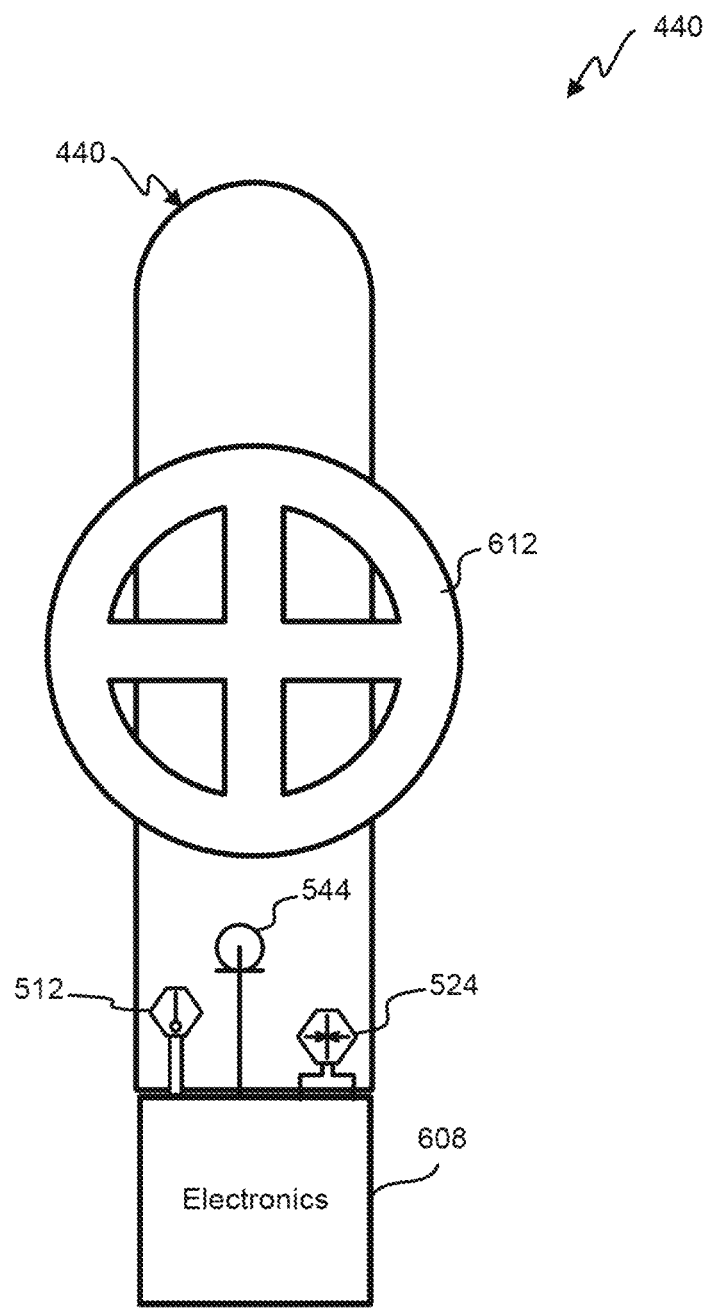
FIG. 6 depicts a block diagram of an embodiment of a water fixture that is fitted with integral sensors.

Referring next to FIG. 6, an embodiment of water fixture 440 that is fitted with integral sensors to provide some of the capability of the water device of FIG. 5. An electronics module 608 includes a network interface for LAN and/or WAN communication along with circuitry to operate sensors and process or partially process the resulting readings. This embodiment includes a temperature sensor 512, pressure sensor 524 and a sonar microphone 544, but other embodiments could include more or less sensors. For example, some embodiments include a sonar emitter or a combination pressure and temperature sensor. The water fixture 440 could have other electronic features such as adjusting the egress flow to override a manual knob 612 or mixture of hot and cold water to adjust the temperature of water exiting the water fixture 440.

Figure 7:
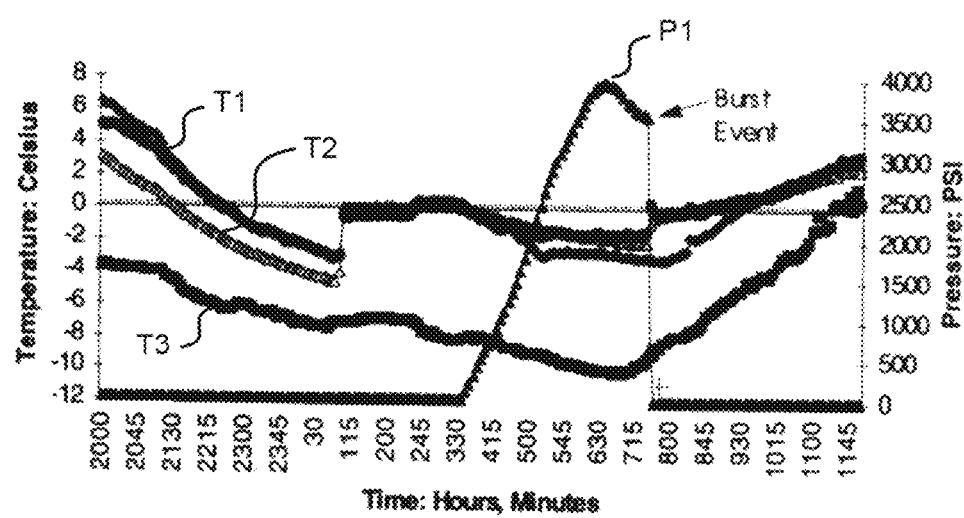
FIG. 7 depicts a graph of temperature and pressure data over time for a burst event caused by a frozen pipe within a plumbing system.

With reference to FIG. 7, an example of temperature and pressure data read from within the pipe 510 by a water device 120 is shown over time for a burst event caused by a frozen pipe within the plumbing system 116. A burst event is generally preceded by large spike in pressure P1 as water freezes and expands in the plumbing system 116, but is followed by a large fall-off in pressure P1 after the burst when water egress reduces the previously captive pressure. Different types of plumbing systems and water supplies will have different sensor readings around a frozen pipe.

The frozen pipe may be a small portion of the plumbing system 116, for example, near an exterior wall of the building 112 on a very cold weather day. The remainder of the plumbing system 116 may have better insulation from the weather outside for the building 112 such that a freeze in those portions is not a threat. Alternatively or in addition, the frozen section may be a weak joint or a corroded wall that has a heightened susceptibility to freezing as compared with the rest of the pipe. The water and metal pipes of the plumbing system 116 conduct the temperature of the frozen pipe back to a water device 120 such that there is a general down trend in temperatures T1, T2, and T3, which are measured by three separate temperature sensors 512 that may be in the same water device 120 or spread throughout the plumbing system 116.

As water in a pipe begins to freeze, the temperature of the water drops below 32° F., goes down to 26-28° F., and then creates dendritic formations in which the liquid molecules convert into free-floating crystals. When enough cold energy has been absorbed, the dendritic formations combine to form a solid blockage in the pipe, and the temperature increases to 32° F. There is a short spike in the pressure, then the spike disappears once the pipe bursts.

There is always some noise in the plumbing system 116. However, once the ice forms, the ambient noise between 20 Hz and 25 Hz is muted or dampened. Similarly, the white noise between 0 Hz and 60 Hz is muted or dampened. The quiet caused by the ice may be used to indicate a frozen pipe instead of thermal expansion. Once the pipe bursts, the quiet period changes to a very loud and turbulent period with water rushing out of the pipe. This noise may be detected with an audio sensor.

There are several ways to distinguish an ice blockage from thermal expansion caused by normal flow of hot water through the plumbing system 116. While an ice blockage causes a rapid increase and decrease in pressure, thermal expansion causes a slow increase and decrease in pressure. Also, the temperature of the water will be colder for the ice blockage than for thermal expansion. As discussed above, the noise characteristics of the ice blockage are different from the noise characteristics of thermal expansion. Further, temperature readings from other sensors, such as public weather information and/or third party sensors outside of the building 112, may indicate that the outside temperature is less than 32° F., which is more likely to correspond to an ice blockage.

Various measurements, such as spectral sensing and pressure sensing, may be used to predict a time at which dendritic formations and/or solid ice blockages may be formed in the pipe. If a pipe freeze is predicted, it may be possible to prevent the pipe from bursting by various methods. If it is not possible to prevent the pipe from bursting, it may still be possible to reduce the damage by relieving pressure downstream of the burst, such as by opening a faucet downstream of the freeze. An early indicator of a pipe freeze may be that the temperature of water flowing through a fixture, such as the kitchen sink, drops below a threshold, such that the water becomes much colder than it should be based on the surrounding temperatures.

The change in pressure may be easier to observe if the sensor is downstream of the freeze. However, if the sensor is upstream of the freeze, there is a more subtle rise in pressure, because the plumbing upstream of the freeze absorbs some of the effects of the ice growing. If there is an indication that ice may be forming downstream of the sensor, the shutoff valve may be closed, which creates a pressure vessel upstream to determine whether the downstream conditions can be recreated upstream. The pressure may be monitored when no water is flowing through the plumbing system 116. If there is a downstream freeze, the pressure will increase. Further, if the temperature falls below 32° F., the shutoff valve may be closed as a precaution.

Figure 8A:
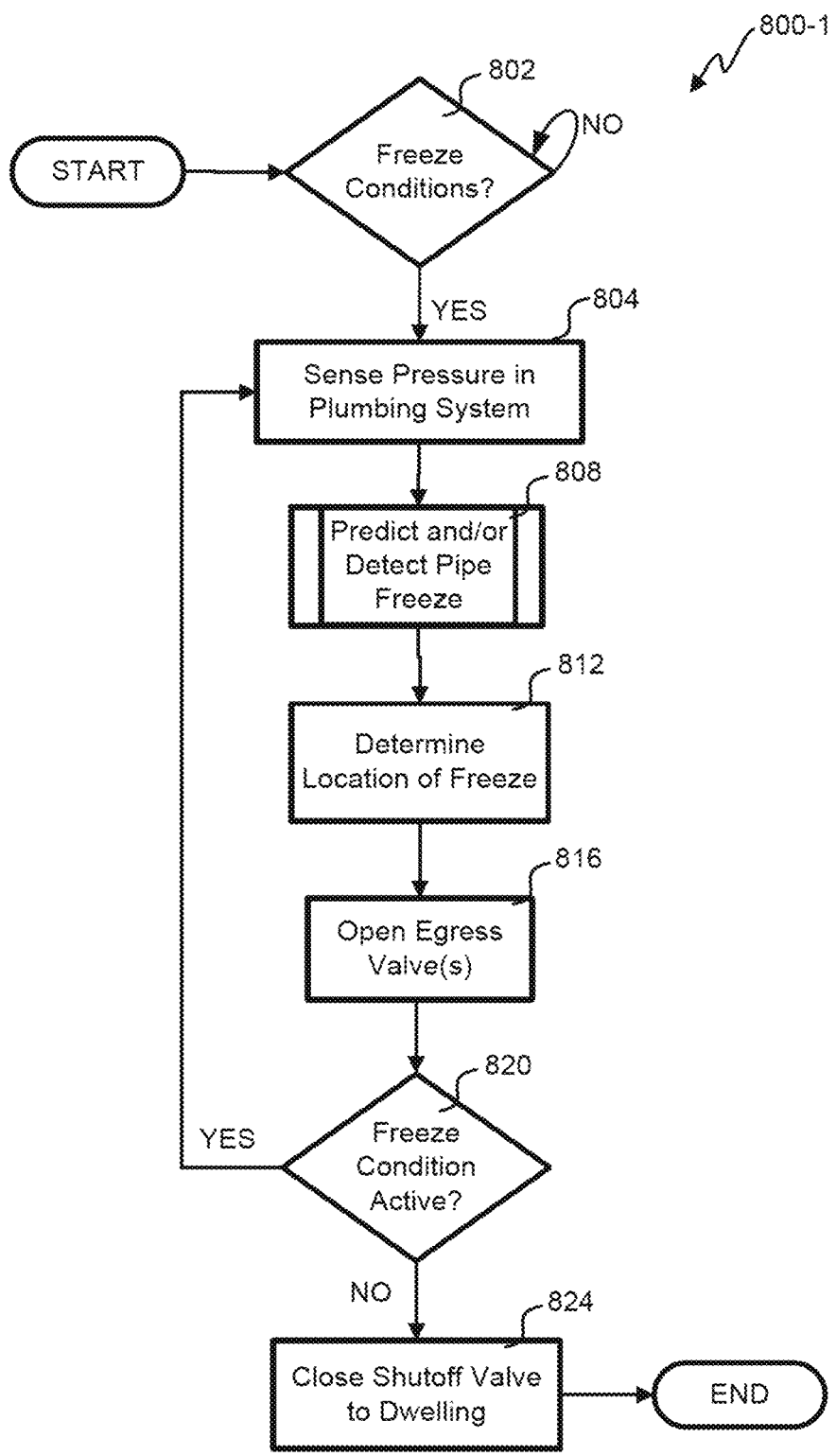
FIGS. 8A-8C depict flow charts of embodiments of methods for predicting, detecting, and/or mitigating damage from a pipe freeze.
Figure 8B:
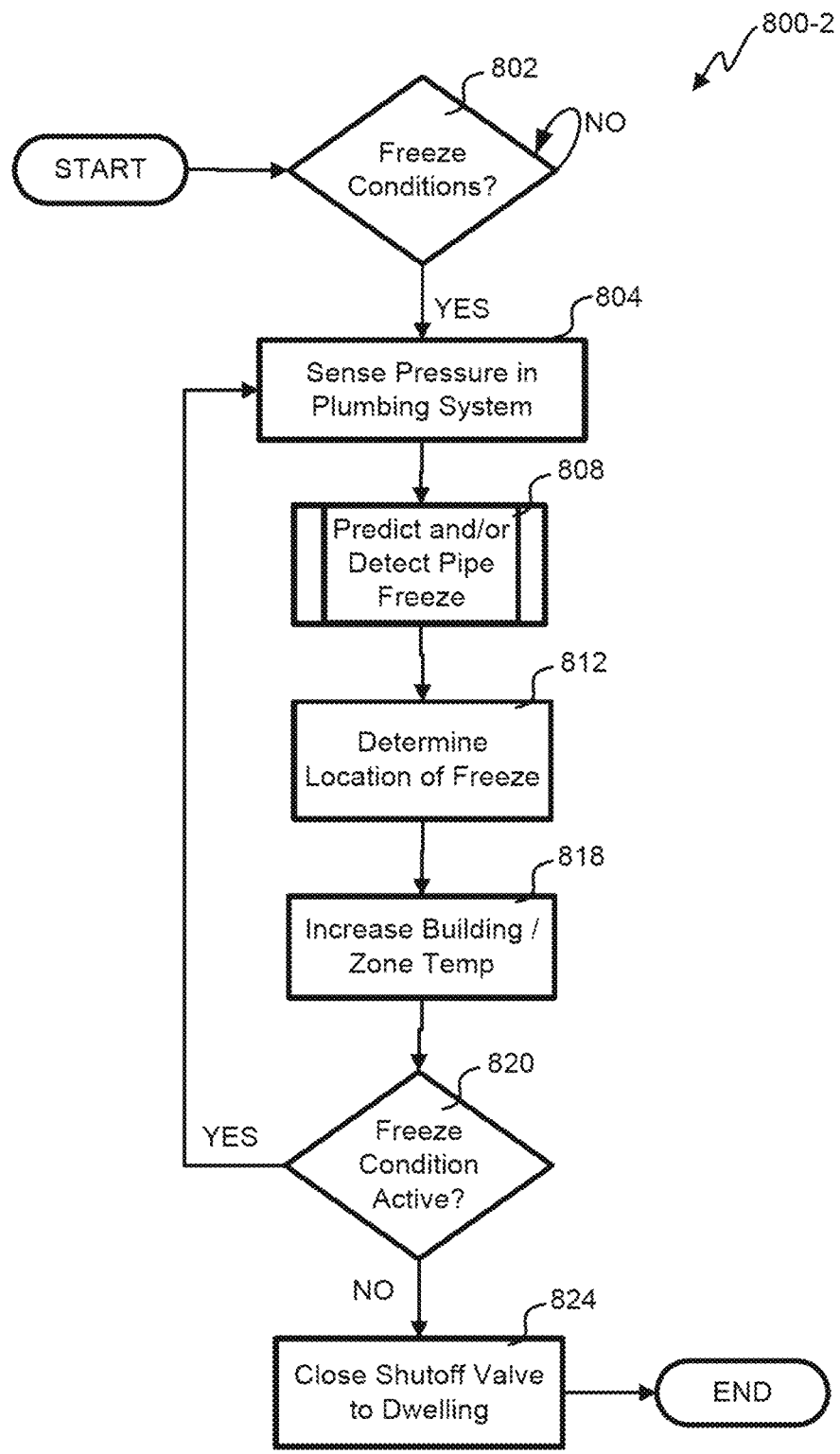
Figure 8C:
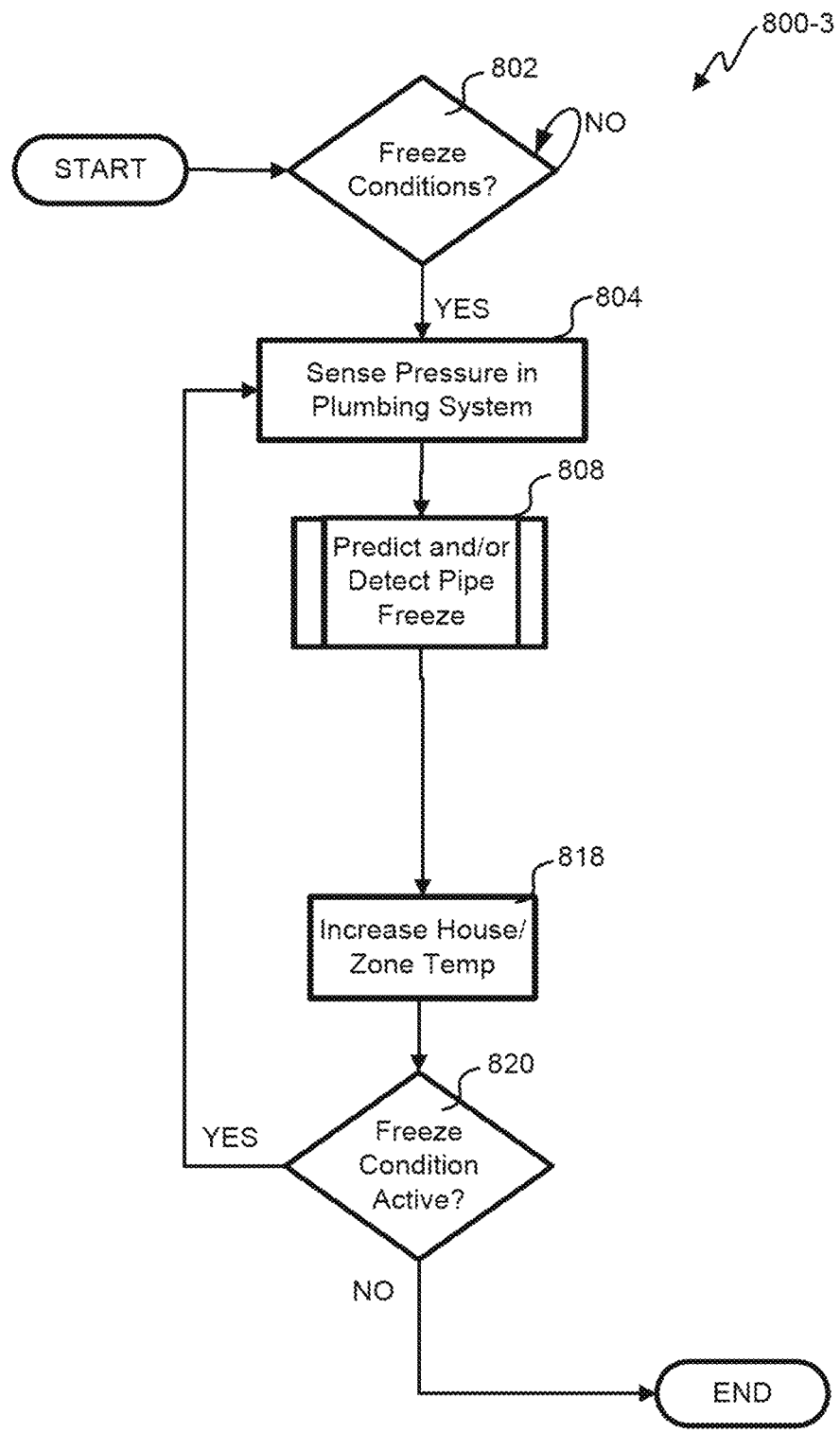

Referring next to FIGS. 8A, 8B and 8C, embodiments of processes 800 for predicting, detecting, and/or mitigating frozen pipe damage are shown. The depicted portion of the process 800-1 for embodiment in FIG. 8A begins in block 802 where general freeze detection circumstances are determined. This could be performed by a temperature sensor 512-3 measuring indoor temperatures of the building or a temperature sensor 512-1, 512-2 coupled to the water in the pipe 510. Other IoT devices in the building 112 may gather interior temperature and make that available through an API or cloud interface to the water analysis system 100. For example, thermostats, smoke detectors, and video cameras from various manufacturers may gather temperature information. Some embodiments may communicate with a weather station on the network 134 or across the internet 104 to gather outside temperature. Regardless of how temperature information is gathered, the conditions for pipe freeze are determined in block 802, the process 800-1 may continue when a freeze is possible.

In block 804, pressure information is gathered or retrieved. Generally, water devices 120 collect pressure information longitudinally over time. The frequency of the readings may be increased after a possible freeze condition is detected, but in any event there would be past pressure information stored for the pipe 510. Frozen pipes may be predicted and/or determined in block 808 in a variety of different ways in different embodiments, such as those discussed below with reference to FIGS. 9A-9E.

In block 812, the location of the freeze is determined or estimated. There are a variety of ways to determine the location. The water device(s) 120 can activate its shutoff valve 532 and measure how the pressure in the pipe 510 reacts. Should the pressure drop, there is a burst pipe downstream. If the pipe is frozen but not burst, pressure will increase between the shutoff valve 532 and the water device 120 as ice continues to form. If there are multiple places in the plumbing system 116 where sensor information is gathered, those readings can be compared to determine where the burst or frozen pipe is. For example, a deployment with two water devices can compare the time delay in receiving pressure changes, and triangulate the location of the leak and/or the freeze. A frozen pipe largely blocks or dampens pressure waves from transmission when compared to having a fluid media in that same stretch of pipe 510. Some embodiments may autonomously open water valves on fixtures and appliances to see how the pressure signal propagates through the plumbing system 116 to determine the location of the pipe freeze.

Some embodiments build a model of the most susceptible pipes by measuring temperature at egress to know which pipe runs are most affected by outside temperatures and susceptible to freezing. For example, cold days will bleed that cold to susceptible pipe runs. The water device 120 could turn on multiple valves and measure temperature with each on to see which ones the temperature drops the most to know where the freeze is likely to happen.

A frozen pipe will often lead to a burst event, especially in ceramic or metal pipes that are not plastic. The burst event often occurs at the weakest point of the pipe, and not necessarily at the freeze location. Sometimes the frozen pipe also blocks the leak, but once the ice melts the leak suffers unintended egress. Some fixtures and appliances have the capability to open water valves to release water pressure in a way that does not cause property damage. In block 816, those valves may be opened. By mapping the location of the freeze/burst condition, only those valves that prevent further pipe or property damage may be opened. For example, a pressure spike from a frozen pipe could be ameliorated by opening water valves downstream from the freeze. Ongoing pressure readings allow knowing when the pressure is within limits and unlikely to cause a burst condition. The valve could be opened to an appropriate amount to prevent freeze, but not excessively waste water. A model of the temperature differential between the water and the weather and susceptibility of each run of pipe to that cold could be used to predict how much water to run. Either the hot or cold water could be run depending on which branch is more likely to experience the freeze. While the freeze condition is still active as determined in block 820, processing loops back to block 804 to continue prediction, detection, and mitigation.

At some point, the freeze condition has passed as determined in block 820 such that there is no longer a threat of a frozen pipe. Where a pipe has burst within the building 112, flooding can cause serious property damage. In block 824, the shutoff valve 532 is activated to prevent additional flooding. On the other hand, if the freeze condition is still active, cutting off the water flow could increase the risk of a frozen pipe upstream of the water device 120 so further mitigation would continue in this embodiment. The municipal water system can absorb increases in pressure from the freeze in the plumbing system such that the shutoff valve 532 may only be activated with the risk of the freeze in the pipe expanding going away with a heating trend determined.

With reference to FIG. 8B, the depicted portion of the process 800-2 is very similar to the embodiment of FIG. 8A with the exception that block 816 is replaced by block 818 to provide another mitigation method. When a freeze is predicted at block 806 and/or detected at block 808, the water device 120 and/or cloud analyzer 108 communicates with the HVAC system to cause all or a zone of the building 112 to begin warming to mitigate the freeze condition. Where a zone is warmed it may correspond to the location of the freeze determined in block 812. Feedback from the block 808 may be used to determine when to stop heating so that minimal energy is spent preserving the plumbing system 116 and avoiding the burst pipe. Other embodiments could use multiple forms of mitigation by both opening valves and heating the building 112 or a zone of the building 112.

Referring next to FIG. 8C, the depicted portion of the process 800-3 is similar to the embodiment of FIG. 8B with the exception of removing blocks 812 and 824. Knowing the location of the freeze is not particularly important when the mitigation in block 818 is to heat the entire building 112. Removing block 824 may be done where there is no shut off valve or in circumstances where the freeze is likely to be upstream of the shut off valve. Some embodiments could open valves to have water flow from the municipal water system 128 to the plumbing system 116 before it would stay stationary long enough to freeze when exposed to outside weather.

Referring next to FIGS. 9A-9E, embodiments of processes 808 for predicting and/or detecting a pipe freeze are disclosed. The depicted portion of the process 808-1 for embodiment in FIG. 9A begins in block 904 where the temperature inside and outside the building is determined. This may include determining how far the temperature is below freezing. Third party APIs to temperature sensors accessed on the LAN, cloud interfaces to weather stations across the Internet, and/or readings of water or room temperature from the water device 120 may be accessed to determine outside and inside temperature for the building 112 in various embodiments. In block 908, an increasing pressure trend inside the pipe 510 is the trigger for determining an impending freeze. For example, the slope of the graph of pressure P1 as a function of time shown in FIG. 7 may be analyzed. Where the pressure is not increasing for previously unfrozen pipes as determined in block 908, there is no issue and processing ends. On the other hand, if the pressure is increasing, the slope may be analyzed to predict and/or detect a pipe freeze in block 910.

In block 912, there is an increasing pressure trend that is further analyzed. Pressure increases quickly as a freeze moves up the pipe with a reading of 300-600 psi very quickly happening on the closed portion of the pipe 510 as read by a downstream pressure sensor 524. Where there is a steep fall off in pressure as determined in block 916 it is determined in block 920 that is due to a burst pipe. Again, the slope of the graph of pressure P1 as a function of time shown in FIG. 7 may be analyzed. On the other hand, where there is no cliff in the pressure readings, a freeze may be imminent or the plumbing system 116 may be under normal operation. For large spikes beyond normal water pressures, remediation can happen immediately to avoid a burst pipe.

Figure 9A:
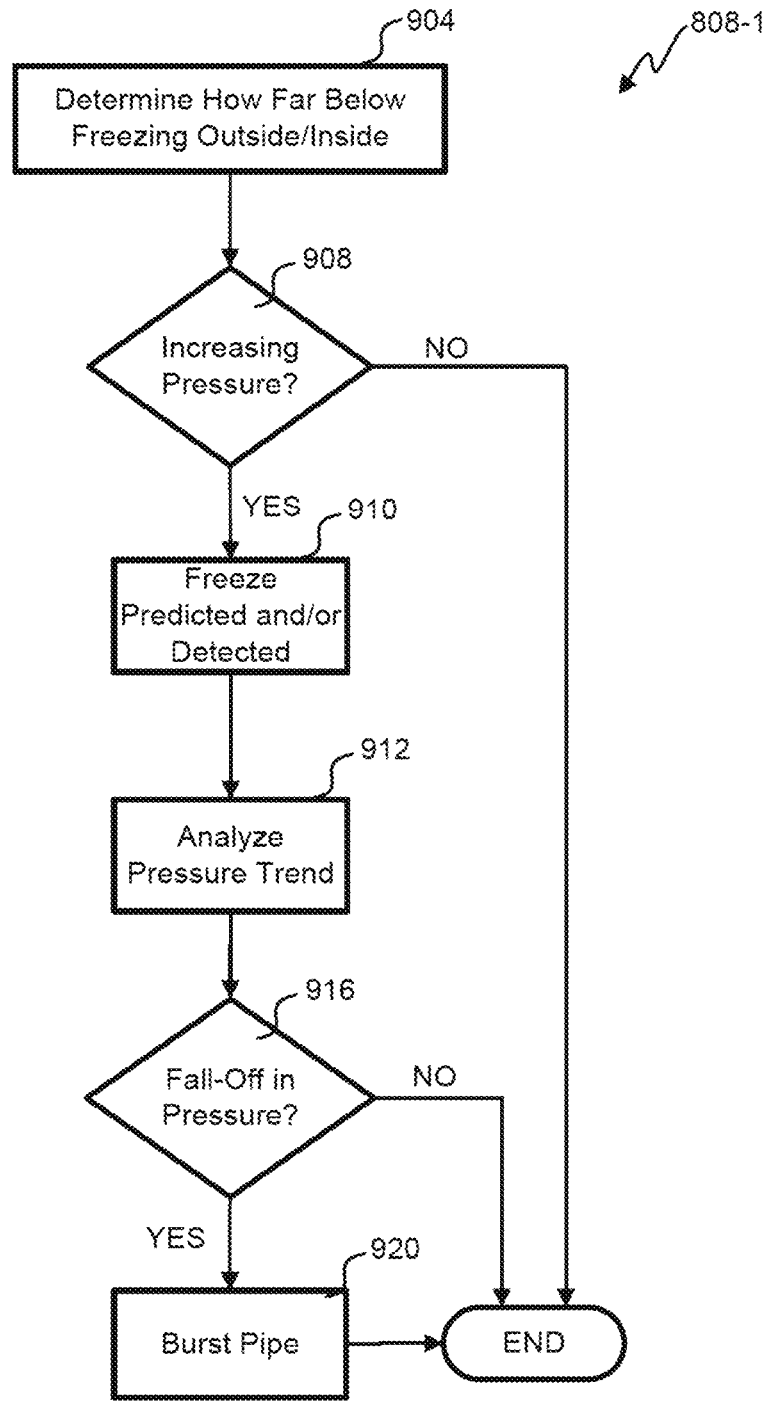
FIGS. 9A-9E depict flow charts of embodiments of methods for predicting and/or detecting a pipe freeze.
Figure 9B:
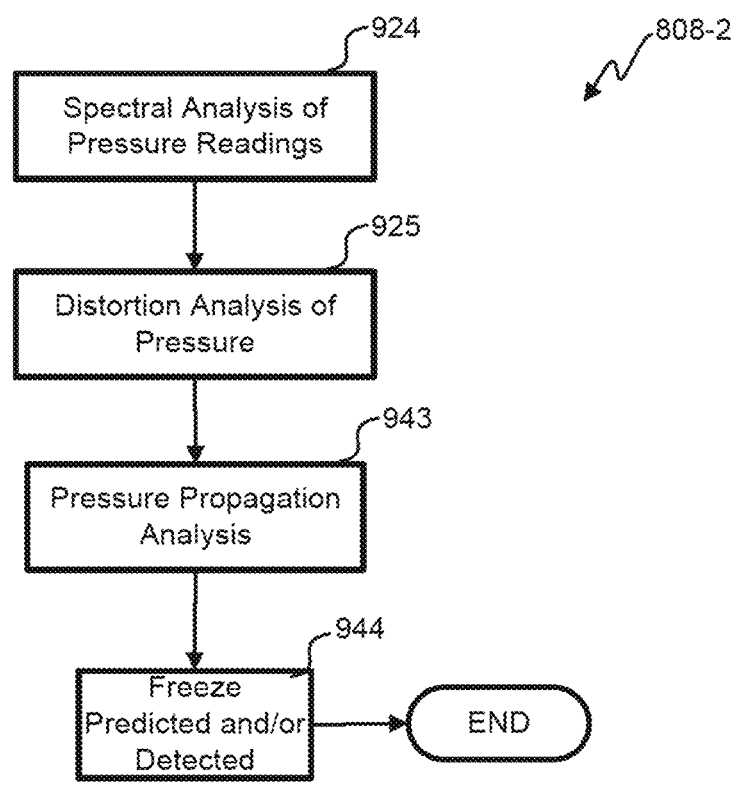

With reference to FIG. 9B, another embodiment of a process 808-2 for predicting and/or detecting a pipe freeze is shown. In block 924, a spectral analysis of pressure readings as a function of time is performed. Ice in the pipes dampens pressure signals from the municipal water system 128. As the viscosity of cold water increases and dendritic formations start to form as discussed above, there is a general dampening for spectral energy across the frequencies of interest. The pressure amplitude will also decrease, and there will be a time delay in the propagation of the pressure waves. Cold water causes the wavelength of pressure waves to widen differently according to wavelength and the characteristic signature of each fixture will be stretched. These distortions caused by the water as a communication medium allow detection of a freeze condition away from a water device 120 as analyzed in block 925. Further, where there are two pressure sensors at different places in the plumbing system 128, there is a known delay between the waves across the distance that the water travels between the two pressure sensors. When that delay increases, a freeze can be determined to be imminent in block 943. Reflections in the pressure waves will be similarly distorted and delayed. In block 944, a final conclusion is made on whether a freeze has happened or is imminent based on the spectral characteristics discussed above.

Figure 9C:
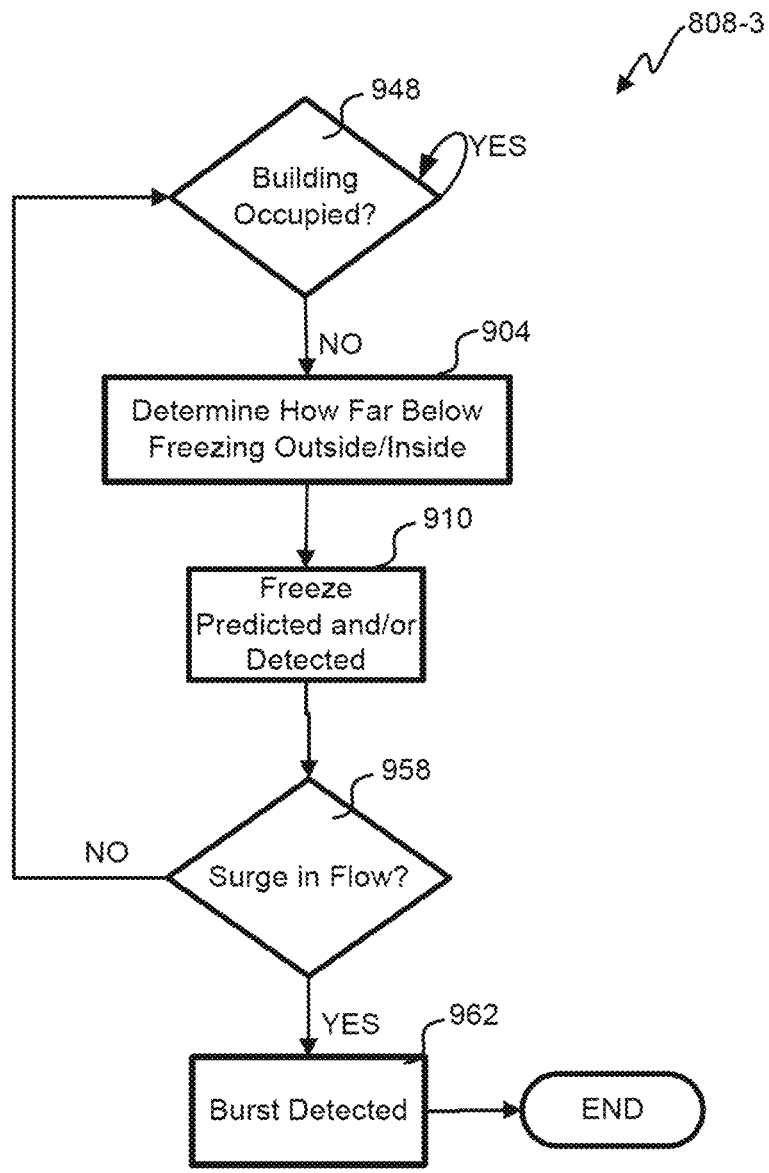

Referring next to FIG. 9C, yet another embodiment of a process 808-3 for predicting and/or detecting a pipe freeze is shown. The depicted portion of the process begins in block 948 where a determination is made whether the building 112 is occupied. If the building 112 is occupied, processing stalls in that block. This is because a pipe freeze is less likely to occur when the building 112 is occupied, because the occupants are likely to use various water fixtures, such that water flows through the plumbing system 116. Occupancy can be determined by measuring whether there has been any egress from the plumbing system for a period of time or communicating with third party sensors such as motion detectors in the HVAC or alarm system and surveillance video equipment. Other embodiments could determine occupancy by geolocation of the phones on which the app for the water device has been installed.

When there is no occupancy, processing continues to block 904 where a determination is made of how far below freezing it is inside the building and/or outdoors. The most damaging flood conditions generally occur when a pipe bursts and no one is home to turn off the water to the building 112. Where the outdoor conditions are far below freezing, the frequency of sensor readings may be increased to more quickly detect a burst pipe. In block 910, a pipe freeze is predicted and/or detected by any of the methods disclosed herein. For example, the pressure readings shown in FIG. 7 may be analyzed to predict and/or detect a pipe freeze, and this determination may be confirmed by the temperature measurements. In block 958, it is determined whether there is a surge in water flow through the pipe. This determination may be made by the flow sensor 528. If there is no surge in water flow, processing loops back to block 948. If there is a surge in water flow and the building is unoccupied, the surge in water flow is attributed to a burst pipe in block 962.

Figure 9D:
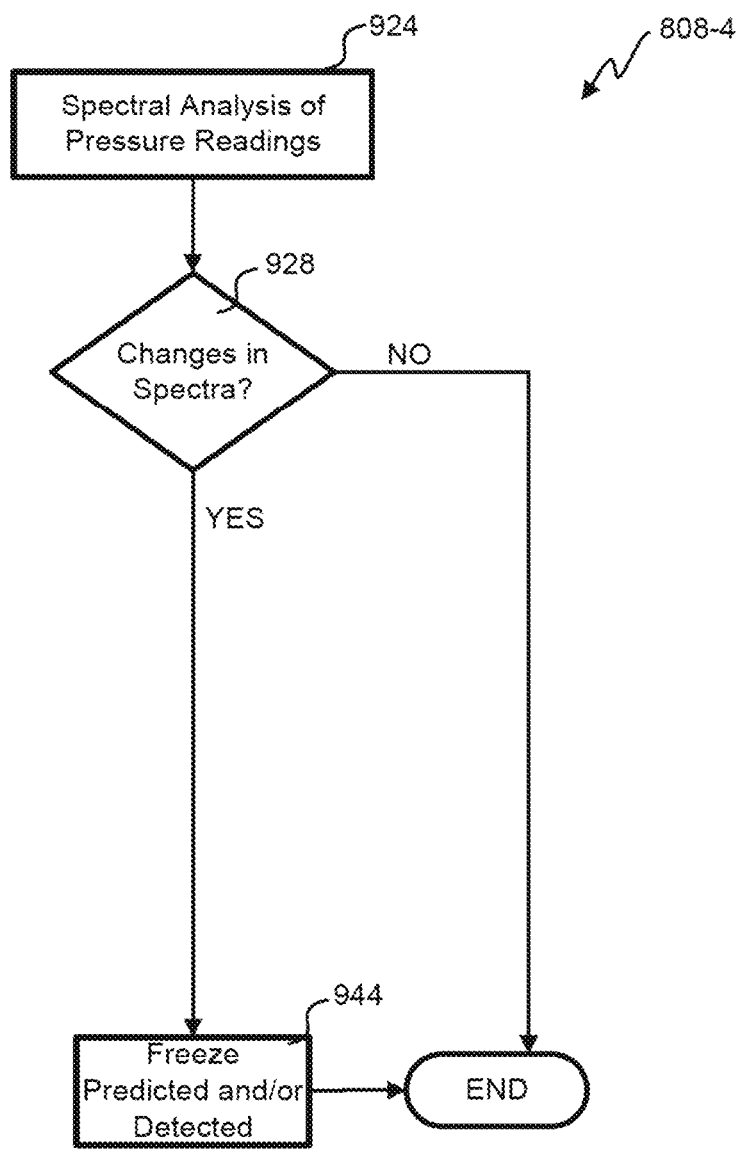

With reference to FIG. 9D, still another embodiment of a process 808-4 for predicting and/or detecting a pipe freeze is shown. In this embodiment, spectral analysis of the pressure readings as a function of time is performed in block 924. Pressure waves are received that include noise from the municipal water system 128 from neighbors, etc. as well as usage within the building 112. The spectra distorts as the water is about to freeze or has already frozen and those changes are detected in block 928. Deep learning algorithms may be used to recognize the characteristic distortion over a wide variety of different buildings, different parts of the country, etc. The pattern recognition for this distortion could be performed in the building 112 or in the cloud analyzer 108 to predict or detect a pipe freeze in block 944.

Figure 9E:
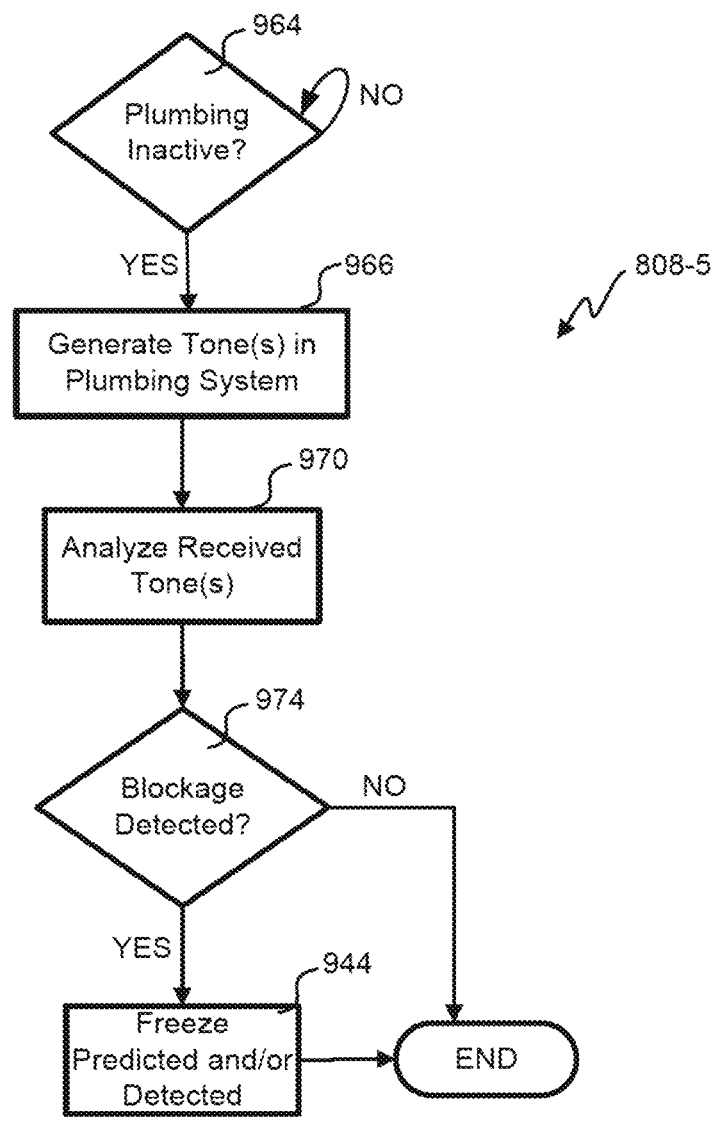

Referring to FIG. 9E, another embodiment of a process 808-5 for predicting and/or detecting a pipe freeze is shown. The depicted portion of the process begins in block 964 where a determination is made whether there is activity within the plumbing system 128 for the building 112, and waiting when there is activity indicating that the building 112 is occupied. If there is no occupancy, processing continues to block 966 where the sonar emitter 540 is used to generate a tone(s) in the plumbing system 128. The tone(s) is coupled by the water in the pipes to a sonar microphone 544 and analyzed in block 970. The sonar microphone 544 may be in the same water device 120 as the sonar emitter 540 to receive reflections from a blockage, or the sonar microphone 544 may be in another water device 120 to receive transmissions through an area of the pipe where a blockage may occur. Any freeze blockage will largely block propagation of the sonar waves and cause a reflection. The early reflection to the emitting water device 120 or the lack of detection at a downstream water device 120 both indicate a blockage in block 974. Using that determination, a freeze may be predicted and/or detected in block 944. This may be a confirmation of a determination of a freeze that is made by another method, such as analyzing the pressure readings shown in FIG. 7. Some embodiments could use different wavelength sonar tones, because distortion varies with wavelength and temperatures. Early detection of a freeze may be possible.

A number of variations and modifications of the disclosed embodiments can also be used. For example, the plumbing analyzer can be used to monitor any liquid distributed in pipes. This could include industrial plants, sprinkler systems, gas distribution systems, refineries, hydrocarbon production equipment, municipal water distribution, etc. The plumbing system is a closed system with pressurized liquid (e.g., a gas) that is released in a selective and controlled manner using valves.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction (s) and/or data.

While the principles of the disclosure have been described above in connection with specific apparatuses and methods, it is to be clearly understood that this description is made only by way of example and not as limitation on the scope of the disclosure.

What is claimed is:

1. A system for analyzing water in a plumbing system, the system comprising:
 a first sensor that is configured to measure pressure within a pipe in the plumbing system as a function of time;
 a second sensor that is configured to measure the pressure within the pipe in the plumbing system as a function of time;
 a processor that is configured to determine a state of water within the pipe by analyzing the pressure within the pipe as a function of time, wherein:
 pressure as a function of time is analyzed using machine learning techniques to determine the state of the water,
 the state of the water comprises at least one of a prediction that the water within the pipe will freeze or a determination that the water within the pipe has frozen,
 the first sensor is arranged at a first location within the plumbing system that is remote from a second location within the plumbing system that corresponds to the state of the water,
 the second sensor is arranged at a third location within the plumbing system that is remote from the second location within the plumbing system that corresponds to the state of the water,
 and
 the processor is further configured to;
 determine the second location within the plumbing system that corresponds to the state of the water by triangulating measurements from the first sensor and the second sensor; and
 selectively adjust the temperature of the second location by adjusting a temperature of a zone based on the determined state of the water by sending a command to a heating system, wherein the zone is one of a plurality of zones of a building where the plumbing system is placed;
 an interface coupled to a valve connected to the pipe; and,
 an interface coupled to a valve connected to the pipe; and
 a transceiver that is configured to send a signal using the interface to open the valve to release pressure in response to the state of the water indicating that the water within the pipe is likely to freeze.

2. The system of claim 1, wherein the state of the water is determined by analyzing a slope of the pressure within the pipe as a function of time.

3. The system of claim 1, wherein the state of the water is determined by performing a spectral analysis of the pressure within the pipe as a function of time.

4. The system of claim 1, wherein the state of the water is confirmed by analyzing temperature measurements from at least one of within a building that houses the pipe or outside of the building that houses the pipe.

5. The system of claim 1, further comprising:
 a transmitter that is configured to transmit a sonar tone toward the second location that corresponds to the state of the water; and
 at least one of:
 a first receiver that is configured to receive the sonar tone after the sonar tone has been transmitted through the second location, or
 a second receiver that is configured to receive the sonar tone after the sonar tone has been reflected at the second location,
 wherein the processor is further configured to confirm the state of the water by analyzing a signal corresponding to the sonar tone from at least one of the first receiver or the second receiver.

6. The system of claim 1, wherein the processor is further configured to determine the second location that corresponds to the state of the water by analyzing the pressure within the pipe as a function of time.

7. The system of claim 1, further comprising:
 a heater that is configured to apply heat to the second location as a function of the state of the water.

8. The system of claim 1, further comprising:
 a flow sensor that is configured to measure a flow of the water within the pipe,
 wherein the processor is further configured to determine whether the pipe has burst by analyzing the flow of the water within the pipe.

9. The system of claim 1, wherein the processor is further configured to determine whether the pipe has burst by analyzing the pressure within the pipe as a function of time.

10. The system for analyzing water in the plumbing system as claimed in claim 1, wherein the machine learning techniques identifies a location of fault inside the plumbing system.

11. The system for analyzing water in the plumbing system as claimed in claim 10, wherein the transceiver is configured to open the valve corresponding to location of the fault.

12. The system for analyzing water in the plumbing system as claimed in claim 1, wherein:
 analyzing temperature measurements for confirming state of water is performed by measuring temperature of the water at different locations in the plumbing system using a first temperature sensor, a second temperature sensor and a third temperature sensor, and
 the first temperature sensor is placed a point of entry of water inside plumbing system, the second temperature sensor is placed within the plumbing system and the third temperature sensor is placed outside the plumbing system.

13. The system for analyzing water in the plumbing system as claimed in claim 1, wherein ambient temperature outside the plumbing system is detected whereby freeze mitigation is further enhanced.

14. A method for analyzing water in a plumbing system, the method comprising:
 measuring, by a first sensor, pressure within a pipe in the plumbing system as a function of time, wherein the first sensor is arranged at a first location within the plumbing system that is remote from a second location within the plumbing system that corresponds to a state of water within the pipe;

measuring, by a second sensor, the pressure within the pipe in the plumbing system as a function of time, wherein the second sensor is arranged at a third location within the plumbing system that is remote from the second location within the plumbing system that corresponds to the state of the water;

determining, by a processor, the state of the water by analyzing the pressure within the pipe as a function of time using machine learning techniques;

determining, by the processor, the second location within the plumbing system that corresponds to the state of the water by triangulating measurements from the first sensor and the second sensor, wherein the state of the water comprises at least one of a prediction that the water within the pipe will freeze or a determination that the water within the pipe has frozen; and selectively adjusting the temperature of the second location by adjusting a temperature of a zone based on the state of the water determined with the machine learning techniques by sending a command to a heating system, wherein the zone is one of a plurality of zones of a building where the plumbing system is placed.

15. The method of claim 14, wherein the state of the water is determined by analyzing a slope of the pressure within the pipe as a function of time.

16. The method of claim 14, wherein the state of the water is determined by performing a spectral analysis of the pressure within the pipe as a function of time.

17. The method of claim 14, wherein the state of the water is confirmed by analyzing temperature measurements from at least one of within a building that houses the pipe or outside of the building that houses the pipe.

18. The method of claim 14, further comprising:
transmitting, by a transmitter, a sonar tone toward the second location that corresponds to the state of the water; and
confirming, by the processor, the state of the water by analyzing a signal corresponding to the sonar tone after at least one of:
the sonar tone has been transmitted through the second location, or
the sonar tone has been reflected at the second location.

19. The method of claim 14, further comprising determining, by the processor, the second location that corresponds to the state of the water by analyzing the pressure within the pipe as a function of time.

20. The method of claim 14, further comprising sending, by a transceiver, a signal to open a valve that is connected to the pipe as a function of the state of the water to release pressure.

21. The method of claim 14, further comprising applying, by a heater, heat to the second location as a function of the state of the water.

22. The method of claim 14, further comprising:
measuring, by a flow sensor, a flow of the water within the pipe; and
determining, by the processor, whether the pipe has burst by analyzing the flow of the water within the pipe.

23. The method of claim 14, further comprising determining, by the processor, whether the pipe has burst by analyzing the pressure within the pipe as a function of time.

* * * * *

UNITED STATES PATENT AND TRADEMARK OFFICE
CERTIFICATE OF CORRECTION

PATENT NO. : 11,499,856 B2
APPLICATION NO. : 16/562862
DATED : November 15, 2022
INVENTOR(S) : Salil P. Banerjee and Ryan Yong Kim It is certified that error appears in the above-identified patent and that said Letters Patent is hereby corrected as shown below:

In the Claims

Column 17, Line 59, delete "and,"
Column 17, Line 60, delete "an interface coupled to a valve connected to the pipe;"

Signed and Sealed this
Tenth Day of January, 2023

Katherine Kelly Vidal
*Director of the United States Patent and Trademark Office*